April 4, 1961  H. L. HOCKEL  2,977,941
SELF-IGNITING, AIR-COMPRESSING INTERNAL COMBUSTION ENGINE
Filed Jan. 6, 1960

*INVENTOR:*
HANS LUDWIG HOCKEL

United States Patent Office 2,977,941
Patented Apr. 4, 1961

2,977,941

SELF-IGNITING, AIR-COMPRESSING INTERNAL COMBUSTION ENGINE

Hans Ludwig Hockel, Mannheim-Feudenheim, Germany, assignor to Motoren-Werke Mannheim A.G. vorm. Benz, Abt. Stat. Motorenbau, Mannheim, Germany Filed Jan. 6, 1960, Ser. No. 762

5 Claims. (Cl. 123—32)

This application is a continuation-in-part of my application Serial No. 653,922, filed April 19, 1957, now abandoned.

The invention relates to internal combustion engines of the compression ignition type in which liquid fuel is injected into the combustion space at approximately the top of the compression stroke and more particularly to the method and apparatus in which an auxiliary combustion chamber is employed for a controlled igniting and progressive burning of a wide range of fuels.

It has long been highly desirable to have a compression ignition engine which will utilize without alteration or change of parts the full range of liquid fuels that are readily available for internal combustion engines of both the spark and compression ignition types. This range extends from the heavy fuels of low octane rating such as diesel oils to the light fuels of low cetane rating as gasoline. Although attempts have been made a provide such an engine and some have been called multi-fuel engines, the results have been either a compromise which leaves much to be desired in performance at both ends of the range or very poor performance is suffered to exist at one end or the other of the range only as an emergency measure. Poor starting conditions generally exist for one of the fuels if not for others and quiet efficient operation with one fuel may involve noisy and poor performance along with other deterrent conditions with different fuels. Fuel mixtures for mid-range operation are not contemplated because an alternative fuel may be resorted to only when others are not available.

One of the sources of difficulty is that combustion processes employed in known engines direct the fuel against and seek to vaporize it as a film-like coating on the wall of a combustion cavity located in the head of the piston where the temperature is about 350° C. Aluminum pistons run cooler for a long start-up time due to the rapid heat conduction and dissipation by the metal and inserts of low heat conductive metal employed to boost the temperature do not remain securely in place very long. The disadvantage of such processes is that cold starting is only possible by means of an air heating device sometimes referred to as a glow-plug which economically can only heat the air under starting conditions to 60° C. until the required temperature of the combustion cavity or chamber is attained.

Moreover, the poor cold starting behavior with such a fuel film is not only related to the deficiency of latent heat derivable from the sensible heat of the cool combustion cavity wall, but adverse conditions further exist in the tendency of the pressure developed by compression to keep the fuel film from vaporizing. The pressure of the compression stroke opposes the effect of the vapor pressure of the fuel. Thus, little enough heat is present for a comparative along time for marginal starting conditions and the quick start and ready operation of a spark ignition engine are therefore lacking.

Assistance in the form of spray atomization under such conditions may be of some help for starting conditions and multiple hole nozzles have been tried. This however, renders it necessary to make wide starting adjustments that vary the injection pump output 180 percent of the full load requirements. Furthermore, multiple hole nozzles are more sensitive to variations in engine operation and lose important injection distance, as compared with a single or pintle jet nozzle, against the increasing resistance or compactness of the air compressed on the compression stroke. In either event, these departures necessitate abandoning much of the standardized equipment in use today which constitutes an additional drawback of large inventories and spare parts service, and encounters an increased sensitivity of the nozzle under working conditions of the engine as compared with the robust pintle nozzle normally used in small diesel engines.

Pintle nozzles and the fuel injection equipment now used in small diesel engines may still be used in the practice of the present invention for the full range of fuels readily available.

A further factor is involved. Turbulence induced by rapidly compressed air flowing in set paths also affects the results of multiple hole nozzle operation adversely notwithstanding a continuing desire in the industry to foster turbulence for atomization. A desirable turbulence pattern under starting conditions often becomes unwelcome for loaded operation of the engine after warm-up and for that reason warm-up turbulation is heretofore relegated to a minor consideration.

In the present invention a pintle nozzle and the jet therefrom is so handled that under all engine start and operating conditions the turbulence pattern, will always assist the fuel jet to maintain its desired path and length of flight without disturbing or turbulating it. Furthermore, adequate temperature vaporization and ignition conditions for excellent starting and full power performance with all fuels, is provided without alteration or change of parts.

For solving the problems mentioned, completely different methods have been followed and improvements over my earlier invention disclosed in Patent No. 2,853,060 have been contrived which have little if anything in common with earlier endeavors to solve the problems. They not only avoid the disadvantages heretofore incurred but further result in unexpectedly improved behavior for cold starting. The cold starting behavior of the present invention is superior to that of the normal pre-combustion chamber process and closely approaches the values obtained in direct injection with a uniform combustion chamber. It is possible to start an engine embodying the invention with a conventional starter without starting assistance at temperatures as low as minus 10° C. with all fuels. Below that temperature a pre-heater plug is necessary but its size and the duration of use for starting is greatly reduced over that already customarily used with divided combustion chambers.

More particularly, the results achieved follow in part from the fact that an auxiliary combustion chamber is thermally disposed to maintain a particular temperature condition for the air compressed on the compression stroke. The cooling required is quite close to that maintained with the air cooling of an air-cooled aluminum head. Consequently where a water jacket is associated therewith the auxiliary combustion chamber is largely insulated by an air gap from the rapid direct metal-to-water head dissipation path. Moreover, the contact areas between the cylinder head and the insert having the air flow passages therethrough, the exposed area, and the amount of metal stock present in the ribs supporting the centrtal passage element, are so determined and selected that the temperature at the wall of the central bore touched by the margins of the fuel jet during working operation of the engine lies between 450 and 650 degrees centigrade.

Furthermore, provision is made for ensuring that the outer flow passages of the insert, through which the main portion of the combustion air flows during the compression stroke, do not assume a temperature above 300° C. This is very important so that no heat radiation will occur of such a magnitude on the fuel jet in the auxiliary combustion chamber as to produce uncontrolled ignition of the fuel jet before its tip reaches the piston side of the insert and marginally touches the hot wall of the central passage of the insert without washing it. The optimum condition is to ignite the fuel jet inside the central orifice of the insert and to burn it completely on its way into the main combustion chamber. The margins of the fuel jet touching the hot wall and being ignited thereby under compression in turn vaporize and burden the rest of the fuel in and beyond the central passage.

For a better understanding of the embodiment and the characteristics of the invention about to be further described, there are essentially five conditions to be satisfied in order to attain the favorable ignition delay and combustion behavior contemplated by this invention with complete indifference to the cetane and octane ratings of the fuel. They, in summary and briefly stated, are as follows:

(1) The liquid fuel spray should not be directed toward or impinge against the hot wall of the central passage. Only its margins lightly touch it and then only at its periphery in a movement parallel to the wall where the fuel particles are few and quite small. The liquid spray portion has a closed solid form for deep penetration and a long flight path and passes into the central passage defined by the hot wall. The spray angle rating is preferably 0 to 4°.

(2) With the size of the central opening determined through which the liquid fuel spray passes, the total area of the openings through which air flows into the auxiliary combustion chamber during the compression stroke is so related that only a slight ingress of air will occur in the central opening so as not to obstruct the outflowing spray or alter its required form. In other words, any spray throttling effect through the central passage is to be kept as little as possible, and what little is present tends to clear the passage with usable air for quick ignition for the next fuel jet.

(3) The temperature of the wall of the passage which is touched by the margins of the fuel spray passing therethrough should be between 450 and 650 degrees centigrade and kept close to such temperature to assume complete burning of all combustible mixtures within its confines before the culmination of the succeeding compression stroke.

(4) At the instant of any ignition of spray particles the tip of the fuel jet must reach at least the piston end of the hot wall passage so that burning proceeds in both chambers.

(5) The temperature of the walls of the air inflow passages in the insert and the wall of the pre-combustion chamber immediately adjacent to the insert should be below 300° C.

These being among the objects and advantages of the invention other and further objects include the provision of a structural arrangement which is easy and inexpensive to manufacture and maintain, rugged under the heaviest of working conditions and essentially self cleaning throughout its lifetime. Other objects and advantages will appear from the appended claims, drawings and description relating thereto.

Figure 1:
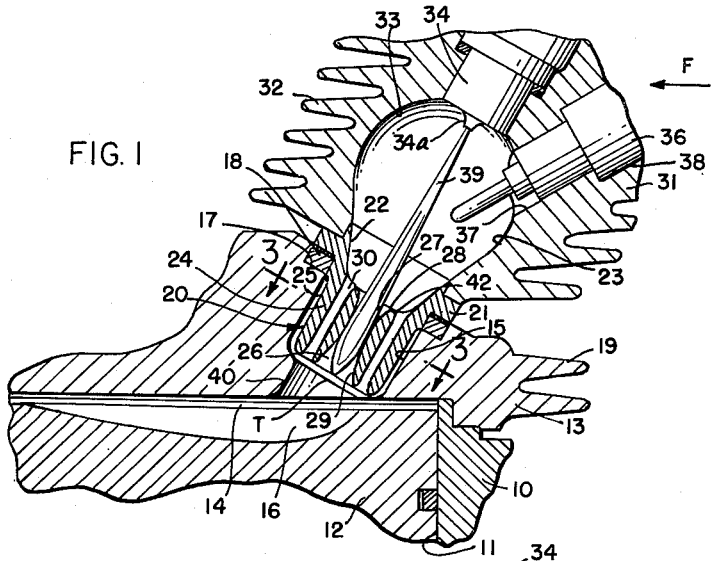
Fig. 1 is a sectional fragmentary view of the pre-combustion chamber, and head, cylinder and piston of an internal combustion engine of the air cooled type embodying the invention.

In Fig. 1 the pertinent structure of an internal combustion engine of the compression ignition type is fragmentarily shown in which an engine block 10 is provided with a cylinder bore 11 therein to receive in reciprocating relationship a power transmitting piston 12 shown at the top of its compression stroke. A cast head 13 of a light weight high heat conductive metal such as aluminum or an alloy thereof is secured in place on the block 10 by conventional means (not shown) to close the top of the cylinder bore 11 and form therewith a main combustion chamber 14 above the head of the piston 12.

The engine head 13 shown in Fig. 1 is air cooled through heat radiating integral fins 19 lying in a path of forced air circulation indicated by the letter F. Depending upon the location of other engine parts in the head 13 a cored opening 15 is provided through the head 13 in a convenient position and axially disposed normal to or at a slant to the top of the piston 12 where the piston preferably is formed with a cavity 16 opposite the opening 15. At its outer end the head 13 is shouldered at 17 to receive a hard metal ring 18 therein which is shrunk into place to provide a sealing means that minimizes damage to the sealing face.

A precision cast insert 20 of heat resisting turbine blade steel is supported on the ring 18 by a flange 21 engaging the ring in sealed relationship. At the upper end within the flanged portion of the insert a substantially frusto-conical cavity 22 is formed which forms a part of an auxiliary combustion chamber 23 and the other end of the insert 20 is cast to provide an end portion 24 which extends substantially the length of the opening 15 and closely follows the contour thereof but in spaced relationship therefrom to provide an appreciable air space 25 therebetween whereby dissipation of heat from the outer surface of the end portion 24 to the engine head 13 is controlled and somewhat restricted.

The end portion 24 of the insert has passages therethrough interconnecting the cavity 22 and the main combustion chamber 14. One of these passages is a central passage 26 preferably shaped with a venturi shaped throat 27 with the constricting inflow opening 28 disposed towards the cavity 22 and the expanding outflow opening 29 disposed next to the main combustion chamber 14.

Figure 3:
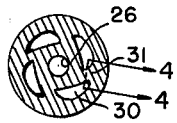
Fig. 3 is a section taken upon line 3—3 of Fig. 1.
Figure 4:
Fig. 4 is a section taken on line 4—4 of Fig. 3.

Arranged peripherally around the central passage 26 are a plurality of air flow passages 30 whose direction is slightly helical as shown in Figs. 3 and 4 where the slant of their partition walls 31 are shown. Air streams passing through the passages 30 from the main combustion chamber 14 will tend to swirl.

This swirling is also true for flow from the other ends of the passages 30 to the engine head 13, but in those instances where the opening is at a slant to the main combustion chamber wall through which it penetrates, stock as at 40 is provided to reduce the open space below the insert to approximately a diameter only slightly greater than the overall outside dimensions of the passages 30 at the inner face of the insert end portion 24. Moreover, for maximum desired compression ratio the depression or cavity 16 in the top of the piston can be circular, elliptical or roughly triangular. However, it is desirable that the cavity be the deepest at the outlet of the insert 24 within the projection of the flow passages 27 and 30 and becomes shallower in an axial direction while widening in a radial direction so that the flow area as far as it extends to the center portion of the piston is never less than the flow area of the opening 15.

On the upper side of the flange 21 is mounted a casting 31 preferably of aluminum cooled by fins 32 and having a pre-combustion cavity or chamber 33 therein of an ovoid contour disposed coaxial with the central passage 27. The smaller end of the ovoid contour converges and fairs into the edges and shape of the cavity 22 in the insert 24. The larger end of the ovoid contour is located remote from the insert 20 and is apertured to receive a fuel injection nozzle 34 therein in alignment with the central passage 27. The nozzle preferably is a mono-jet or throttling pintle nozzle with a spray angle of 0°.

The exposed end of the nozzle 34 is preferably rounded marginally to said ovoid contour and is slightly tapered centrally to extend at the nozzle port slightly into the ovoid chamber to provide cross-sectionally with the ovoid contour a modified heart shaped air flow control wall 34a by which air passing through the openings 30 during the compression stroke of the piston 12 swirls and flows along the ovoid contour upwardly to the top where it is redirected to flow inwardly and downwardly centrally towards the central passage 27 to assist rather than oppose or turbulate the fuel injection jet stream 39 when it is formed.

In those circumstances where it is likely that the engine will be started at temperatures below minus 10° C., a heater plug 36 heated electrically may be provided laterally of the path of the fuel spray jet 39. Otherwise, a closure plug (not shown) may be used or no provision made for a heater plug. If a heater plug might be used, the casting 31 is drilled at 37 and threaded as at 38 to receive the heater plug 36. Whether a heater plug or a closure plug is used it is desired that the inner end of the plug be shaped to close off as much of the drilled opening 37 as possible to enhance a high compression ratio and also be formed at its inner end to follow as closely as possible the ovoid contour of the auxiliary combustion chamber in that area. In this connection it is desirable to have the opening 37 enter the precombustion chamber as near normal to the wall portion it penetrates as possible.

The auxiliary combustion chamber and the flow passages of the insert contain between 30 to 70% of the combustion air, when the piston 12 is at its top dead center. The above-mentioned volume measured in cubic centimeters and divided by the least total cross-section of the insert measured in square centimeters gives a value between 20 to 100 cm. The ratio of the smallest cross-section of the central passage 27 to the sum of the smallest cross-sections of the outer passages 30 as enclosed by their surrounding walls and ribs 31 is between 1:1 to 1:10. The ratio of the length of the auxiliary combustion chamber measured from the end of nozzle to the nozzle-side edge 42 of the central orifice to its maximum diameter is about 1.3:1 to 1:1. The effect of this ratio is that, at the moment of ignition, depending on the momentary speed of the engine, the tip T of the fuel jet stream is situated between the inner end of the central bore 27, facing the piston depression, and the piston depression itself. This statement applies to a swept or stroke volume of 0.7 to 1.5 liters per cylinder. For other cylinder sizes some other length to diameter ratio of the auxiliary combustion chamber may be advantageously employed. The ratio of the total cross-section of the ribs 31 to the inner surface of the central bore 26 lies between 1:0.5 and 1:2.

The air gap 25 separating the outer wall 24 from the corresponding bore 15 of the cylinder head is 0.5 to 0.2 mm. in size. The foregoing dimensional data are to be regarded merely as guide values. They must be modified in individual cases to provide the temperature values desired in connection with the heat drain effect of the head 13 thereupon. The specified temperature values are measured by means of thermocouples, the tips of which are situated at the center of the ribs 31 and at the center of the outer wall 24.

By way of explanation the values given in the foregoing description relate to a condition which has always been the aim in the design of combustion chambers of diesel engines but has not been heretofore attained. The maximum value of the ignition pressure of 60–65 kg./cm.$^2$ represents the attainable minimum stressing of the mechanism with a compression ratio of about 1:20 which is desirable for small, high-speed diesel engines, with which the invention is primarily concerned and to which the description herein is particularly directed as one of many and various embodiments of the invention.

The low rate of pressure rise of a 2 kg./cm.$^2$ per degree of crank angle reduces the structure-borne sound of the combustion noise below the noise level of the other noise producing parts, such as valves, piston, gears, pumps and cooling fan. The desirable insensitivity to the cetane number of the fuel makes it possible to use without difficulty or loss of performance any and all liquid hydrocarbons having a very low cetane number, including gasolines having high octane numbers. It is to be noted that this insensitivity to the fuel widens to the fully range of readily available fuels the scope of use of the diesel engine without alteration, change of parts or major adjustments.

It will also be noted that this is accomplished in a very small space in order to provide a 1 : 20 compression ratio, or better, in a small high speed engine.

Figure 2:
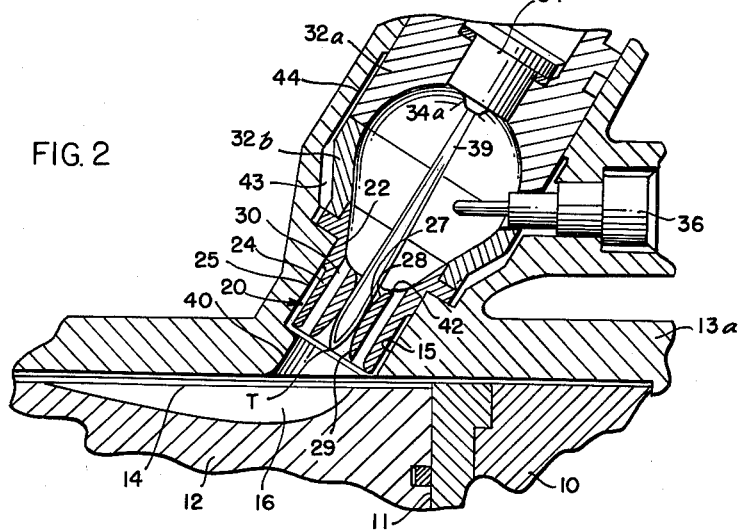
Fig. 2 is a view similar to that of Fig. 1 in which a modification of the invention is shown embodied in a water cooled internal combustion engine.
Figure 5:
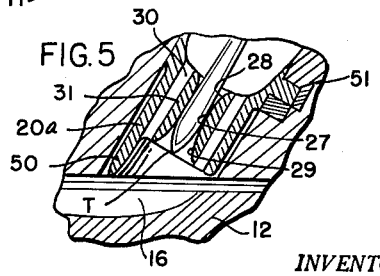
Fig. 5 is a view similar to Figs. 1 and 2 showing another embodiment of the invention.

Referring now to the embodiment shown in Fig. 2 where the numerals refer to like parts and like numerals with suffixes refer to corresponding parts or structure, the head is a water cooled head 13a, and instead of fins 32 the auxiliary combustion envelope is substantially enclosed within the confines of metal of the head cooled by liquid coolant. In this instance the auxiliary combustion chamber is made up of three parts forming the envelope, the insert 20, an upper part 32a and an intermediate part 32b. The intermediate part is isolated from the direct contact with the water cooled metal by a wide lower gap 43 and a narrow upper gap 44. The dimensions of these air gaps 43 and 44 are so selected that the temperature of the auxilitry combustion chamber between the insert and the injection nozzle 34 drops approximately linearly from 300° C. to 80° C. The air gap 43 will run between 1 and 2 mm. but the air gap 44 is only .1 to .2 mm. This is equally true of the air gap 25 in both embodiments, and although it is preferred to proportion the stock of the insert 20 and heads 13 and 13a as shown in the drawings, so that the relative rotational position of the insert is immaterial, the enlargement 40 can be dispensed with and a lip 50 (Fig. 5) on the insert 20a substituted therefor whose length can be varied depending upon whether the desired temperatures mentioned have been obtained at full load and full engine speed for a state of equilibrium. However, care and rotational orientation expedients 51 may be required to insure that the lip 50 will not interfere with the movement of the piston 12.

In operation, the fuel is injected within the last 20 to 25° of crank rotation before top dead center is reached on the combustion stroke at 2000 r.p.m. The jet 39 coming from the pintle nozzle is a narrow closed one of an angle from 0° to 4° which is surrounded by a thin envelope of small particles more or less held in place or focused by the air environment to pass into the central passage 26 with only a touching contact with the entrance and throat walls at 28 and 27 as they pass substantially parallel thereto with some air entrained from the auxiliary combustion chamber. In other words the external diameter of the closed jet just touches the wall of the central passage and aspirates a little air along with it.

The injected fuel, which already approaches or possesses a certain readiness for ignition on account of the heat of compression and the heat of the auxiliary combustion chamber after the first several ignitions occurring at the start of the engine, ignites in the zone of the central passage 26 which has been rapidly heated to its working temperature due to the poor heat conductivity dissipation of its surrounding wall. The ignition of this limited contacting fuel occurs with a very short ignition delay in a comparatively very small area which is not chilled or washed with liquid fuel. This limited burning supplies large quantities of latent heat of vaporization rapidly to the remaining fuel in the jet and the fuel stream burns progressively as it passes through the central passage to the extent that air is present there for combustion. Any unburnt fuel reaching the piston depression has also been ignited as it passes through the central orifice and will finally burn there quite rapidly with the air it finds there. It is desirable to have fuel burning as soon as possible in the main combustion space to utilize the air already present there.

Some burning of fuel does occur in the auxiliary combustion chamber after ignition has started because after the start of the ignition some of the jet envelope feathers laterally with vaporization from reflected flame heat, mixes with some air and burns in the auxiliary combustion chamber to develop pressure therein. This merely adds to the heat of the air as it is passing back to the main combustion chamber and also begins to preheat the fuel jet a little ahead of its entrance into the central opening because of some entrainment thereof so that actually thereafter the fuel is not only ignited but is burning to some extent as it enters the central passage. After the top dead center is passed, air under the expansion of fuel burning in the auxiliary chamber is forced back through the passages 30 from the auxiliary combustion chamber and as it issues to the main chamber through passages 30 it mixes with the fuel emerging ignited from the central bore and with the helical disposition of the passages 30 working this time to help in a thorough mixing in the main combustion chamber a furious burning and pressure build up culminates in the main chamber.

During this process, there is practically no difference between the auxiliary combustion chamber and the piston cavity 16. There are attained thereby, low fuel consumption values, referred to the effective power, of 175 to 178 g./H.P. hour in the speed range of 1000 to 2000 r.p.m. for a cylinder output of 12 H.P. and a mechanical efficiency of 0.72, practically independent of the kind of fuel employed. Due to the fact that the fuel and air enters directly the piston depression 16 which acts as the principal combustion chamber, the above-mentioned favorable cold starting values are assured. The temperature of the wall of the central passage varies only slightly with the load, since any increase in temperature, due to the greater production of heat at higher loads, is counteracted by the cooling effect, due to the increased drain of latent heat of vaporization for the correspondingly increased quantity of fuel.

The ignition delay being quite short, and the intense heat following ignition being reflected somewhat to the rest of the oncoming fuel stream, the fuel is burning ultimately as it enters the central orifice and therefore, some control of the process of combustion by injection is possible. Consequently, due to the small value of the ignition delay, an adjustment of the start of fuel injection in accordance with engine speed is not necessary. Moreover, in the case of fuels of low cetane numbers, such as high octane gasoline, with which the ignition delay is approximately twice as long as with diesel oil, it is always still so short that the favorable combustion behavior is present and maintained also with this kind of fuel.

Not only is the ignition started quickly enough to be insensitive to the cetane condition of the fuel, but it is to be noted also that the rate of burning and application of pressures developed by the products of combustion is also insensitive to octane variations. Before ignition is started, there is little if any chance of pre-ignition due to the coolness of the air in the auxiliary combustion chamber. Therefore, since the flight of the fuel jet is a constant factor before ignition occurs, since it is through cool air in the combustion chamber in a tight envelope, the timing of the introduction of the jet can be closely set and the resulting start of ignition can be accurately determined in relation to the crank angle of the compression stroke for the greatest efficiency and best performance.

Thereafter since the tight jet is a stream whose flow requires time and heat for combustion, the ignition and combustion is a progressive one accelerated after the crank has passed top center to supply rapidly increasing pressure up to the time the piston reaches its half stroke. The fuel is not conventionally ignited in a noisy quick explosion but rather burns with a quiet progressive consumption in relation to piston movement to provide a much desired sustained pressure for an important effective length of time when the pressure is most effective. For the reasons noted the quietness and efficiency of the engine will be appreciated because of the controlled duration of the burning and pressure build-up in the combustion chambers, particularly the main combustion chamber which is progressively fired with fuel and air from the auxiliary combustion chamber as the movement of the piston on its downstroke progresses.

Having thus described the invention and several embodiments thereof, it will be seen by those skilled in the art how the objects and advantages are attained and how various and further modifications can be accomplished within the spirit of the invention, the scope of which is commensurate with the appended claims.

What is claimed is:

1. In an internal combustion engine, a fluid cooled cylinder enclosing a main combustion space, a piston slidable in said cylinder, a fluid cooled cylinder head, an auxiliary chamber enclosing an auxiliary combustion space and disposed in said cylinder head, first wall portions on the exterior of said auxiliary chamber, second wall portions of said cylinder head adjacent to said first wall portions and spaced therefrom, said first and second wall portions defining between them gaps extending substantially along the length of and surrounding said first wall portions, said gaps constituting an air filled isolating space for introducing a temperature gradient between the first and second wall portions, a first cylindrical sleeve, an outwardly directed relatively thin flange upon said first sleeve and secured to and between said auxiliary chamber and said cylinder head to form substantially the only direct thermal contact between said first sleeve and said cylinder head and auxiliary chamber, a second cylindrical sleeve of substantially smaller diameter than said first sleeve and disposed within and spaced from said first sleeve, a plurality of rib-like structures interconnecting said sleeves and introducing a thermal conductivity gradient between said first and second sleeves, said sleeves together with said rib-like structures constituting an insert disposed between said main combustion space and said auxiliary combustion space, said second sleeve defining a central duct through which said main combustion space and said auxiliary combustion space communicate directly with each other and said first and second sleeves defining together with said rib-like structures a plurality of outer ducts for the passage therethrough during a compression stroke of the engine of substantially all air flowing from said main combustion space to said auxiliary combustion space, and a fuel injection nozzle opening into said auxiliary chamber and disposed substantially co-axially therewith for directing a fuel jet through said central duct into said main combustion space, said jet having an outer envelope substantially in contact with said second sleeve.

2. In an internal combustion engine, a fluid cooled cylinder enclosing a main combustion space, a piston slidable in said cylinder, a fluid cooled cylinder head, an auxiliary chamber enclosing an auxiliary combustion space and disposed in said cylinder head, first wall portions on the exterior of said auxiliary chamber, second wall portions of said cylinder head adjacent to said first wall portions and spaced therefrom, said first and second wall portions defining between them gaps extending substantially along the length of and surrounding said first wall portions, said gaps constituting an air filled isolating space for introducing a temperature gradient between the first and second wall portions, a first cylindrical sleeve, an outwardly directed relatively thin flange upon said first sleeve and secured to and between said auxiliary chamber and said cylinder head to form substantially the only direct thermal contact between said first sleeve and said cylinder head and auxiliary chamber, a second cylindrical sleeve of substantially smaller diameter than said first sleeve and disposed within and spaced from said first sleeve, a plurality of rib-like structures inter-connecting said sleeves, the ratio of the inner surface area of the second sleeve to the sum of the areas of the heat conductive cross sections of the rib-like structures lying between 0.5 to 1 and 2 to 1 for introducing a thermal conductivity gradient between said first and second sleeves, said sleeves together with said rib-like structures constituting an insert disposed between said main combustion space and said auxiliary combustion space, said second sleeve defining the central duct through which said main combustion space and said auxiliary combustion space communicate directly with each and said first and second sleeves defining together with said rib-like structures a plurality of outer ducts the relative dimensions of said ducts being chosen to ensure that the volume of the auxiliary combustion space in cubic inches divided by the sum of the least cross sectional areas of said central and outer ducts in square inches lies between 6 and 40 inches, for the passage through the outer ducts during a compression stroke of the engine of substantially all air flowing from said main combustion space to said auxiliary combustion space, the volume of said auxiliary combustion space and said outer and said central ducts form between 30 and 70% of the volume of the total compression space when the piston is at top dead center, and a fuel injection nozzle opening into said auxiliary chamber and disposed substantially co-axially therewith for directing a fuel jet through said central duct into said main combustion space the ratio of the length of the auxiliary combustion chamber as measured from the injection nozzle to the edge of the insert adjacent said nozzle to the maximum diameter of said auxiliary combustion chamber lying between 1 to 1 and 1.3 to 1, said jet having an outer envelope substantially in contact with said second sleeve.

3. In an internal combustion engine, a fluid cooled cylinder enclosing a main combustion space, a piston slidable in said cylinder, a fluid cooled cylinder head, an auxiliary chamber enclosing an auxiliary combustion space and disposed in said cylinder head, first wall portions on the exterior of said auxiliary chamber, a fuel injection nozzle supported at the top of said auxiliary combustion chamber, second wall portions of said cylinder head adjacent to said first wall portions and spaced therefrom, said first and second wall portions defining between them a gap extending substantially along the length of and surrounding said first wall portions and terminating substantially at the same level as said nozzle, said gap constituting an air filled isolating space for introducing a temperature gradient between the first and second wall portions, a first cylindrical sleeve, an outwardly directed relatively thin flange upon said first sleeve and secured to and between said auxiliary chamber and said cylinder head to form substantially the only direct thermal contact between said first sleeve and said cylinder head and auxiliary chamber, a second cylindrical sleeve of substantially smaller diameter than said first sleeve and disposed within and spaced from said first sleeve, a plurality of rib-like structures inter-connecting said sleeves and introducing a thermal conductivity gradient between said first and second sleeves, said sleeves together with said rib-like structures constituting an insert disposed between said main combustion space, and said auxiliary combustion space, said second sleeve defining a central duct through which said main combustion space and said auxiliary combustion space communicate directly with each other and said first and second sleeves defining together with said rib-like structures a plurality of outer ducts for the passage therethrough during a compression stroke of the engine of substantially all air flowing from said main combustion space to said auxiliary combustion space, said fuel injection nozzle opening into said auxiliary chamber and being disposed substantially co-axially therewith for directing a fuel jet through said central duct into said main combustion space, said jet having an outer envelope substantially in contact with said second sleeve.

4. In a compression ignition internal combustion engine, a fluid cooled cylinder defining a main combustion space, a piston slidable in said cylinder, a fluid cooled cylinder head, having an auxiliary combustion chamber disposed therein of ovoid contour, an insert of low heat conductive high heat resistant metal between said chambers having a central passage therethrough defining a venturi throat of predetermined size and a plurality of helically directed air passages therethrough around said central passage and opening at one of their ends in fair relationship with the ovoid contour of the auxiliary combustion chamber, said auxiliary combustion chamber and passages containing from 30 to 70% of the combustion air when the piston is at top dead center and the ratio of the smallest cross-section of the central passage to the sum of the smallest cross-section of the outer passages being in excess of 1 to 1 for the passage through the outer passage during a compression stroke of the engine of substantially all air flowing from said main combustion space to said auxiliary combustion space, and a mono jet fuel injection nozzle opening into said auxiliary chamber disposed substantially co-axially therewith and having a spray angle rating of less than 4° for directing a fuel jet through said central passage into said main combustion space, the outer dimension of fuel jet at said venturi throat being approximately the diameter of said venturi throat.

5. In a compression ignition internal combustion engine, a fluid cooled cylinder defining a main combustion space, a piston sildable in said cylinder, a fluid cooled cylinder head, members supported over a major portion of their assembled length in spaced relationship from contact with the cylinder head and defining an auxiliary combustion chamber disposed therein, said members including an insert of low heat conductive high heat resistant metal between said chambers having a central passage therethrough of predetermined size and a plurality of helically directed air passages therethrough inter-connecting combustion chambers, and a mono jet fuel injection nozzle opening into said auxiliary chamber disposed substantially co-axially therewith and having a spray angle rating of less than 4° for directing a fuel jet through said central passage into said main combustion space, the outer dimension of fuel jet at said central passage being approximately the diameter of said central passage.

References Cited in the file of this patent

UNITED STATES PATENTS

| | | |
|---|---|---|
| 1,136,818 | Leissner | Apr. 20, 1915 |
| 1,646,042 | Schaeren | Oct. 18, 1927 |
| 1,926,499 | Ricardo | Sept. 12, 1933 |

FOREIGN PATENTS

| | | |
|---|---|---|
| 339,450 | Great Britain | Dec. 11, 1930 |
| 498,967 | Great Britain | Jan. 17, 1939 |
| 695,835 | Germany | Sept. 4, 1940 |
| 840,471 | Germany | June 3, 1952 |
| 1,046,794 | France | July 15, 1953 |